(12) United States Patent
Tode et al.

(10) Patent No.: US 7,435,510 B2
(45) Date of Patent: Oct. 14, 2008

(54) NONAQUEOUS ELECTROLYTE SECONDARY BATTERY

(75) Inventors: Shingo Tode, Kobe (JP); Hiroyuki Fujimoto, Kobe (JP); Yasufumi Takahashi, Kobe (JP); Akira Kinoshita, Kobe (JP); Kazuhiro Hasegawa, Kobe (JP); Shin Fujitani, Kobe (JP)

(73) Assignee: Sanyo Electric Co., Osaka (JP)

( * ) Notice: Subject to any disclaimer, the term of this patent is extended or adjusted under 35 U.S.C. 154(b) by 437 days.

(21) Appl. No.: 11/168,380

(22) Filed: Jun. 29, 2005

(65) Prior Publication Data
US 2006/0105241 A1 May 18, 2006

(30) Foreign Application Priority Data
Nov. 12, 2004 (JP) .............................. 2004-329406
Mar. 4, 2005 (JP) .............................. 2005-060288

(51) Int. Cl.
*H01M 4/58* (2006.01)
(52) U.S. Cl. .............. 429/231.3; 429/231.5; 429/231.1; 429/231.6; 429/223; 429/224
(58) Field of Classification Search ............. 429/231.3, 429/231.5, 231.1, 231.6, 223, 224
See application file for complete search history.

(56) References Cited

U.S. PATENT DOCUMENTS

| | | | | |
|---|---|---|---|---|
| 6,277,521 | B1 | 8/2001 | Gao et al. | 429/231.1 |
| 6,582,852 | B1 | 6/2003 | Gao et al. | 429/231.1 |
| 6,811,925 | B2 | 11/2004 | Yamato et al. | 429/231.3 |
| 7,198,871 | B2 * | 4/2007 | Kitao et al. | 429/231.3 |
| 2002/0127473 | A1 | 9/2002 | Ooya et al. | 429/232 |
| 2004/0076882 | A1 | 4/2004 | Hosoya et al. | 429/223 |

FOREIGN PATENT DOCUMENTS

| | | | |
|---|---|---|---|
| JP | 8-250120 | A | 9/1996 |
| JP | 2561556 | B2 | 9/1996 |
| JP | 9-293536 | A | 11/1997 |
| JP | 2855877 | | 11/1998 |
| JP | 3045998 | | 3/2000 |
| JP | 2001-52704 | A | 2/2001 |
| JP | 3244314 | B2 | 10/2001 |
| JP | 2001-351624 | A | 12/2001 |
| JP | 2002-42813 | A | 2/2002 |

(Continued)

OTHER PUBLICATIONS

Yoshio, Masaki et al., "Preparation and properties of $LiCo_yMn_xNi_{1-x-y}O_2$ as a cathode for lithium ion batteries", *Journal of Power Sources*, vol. 90, pp. 176-181 (2000).

(Continued)

*Primary Examiner*—Laura S Weiner
(74) *Attorney, Agent, or Firm*—Kubovcik & Kubovcik

(57) ABSTRACT

A nonaqueous electrolyte secondary battery comprising a positive electrode containing a positive active material, a negative electrode containing a negative active material and a nonaqueous electrolyte, wherein a lithium transition metal complex oxide A formed by allowing $LiCoO_2$ to contain at least both of Zr and Mg and a lithium transition metal complex oxide B having a layered structure and containing at least both of Mn and Ni as transition metals and containing molybdenum (Mo) are mixed and used as said positive active material.

9 Claims, 3 Drawing Sheets

FOREIGN PATENT DOCUMENTS

| | | | |
|---|---|---|---|
| JP | 2002-164053 A | 6/2002 |
| JP | 2002-319398 A | 10/2002 |
| JP | 2003-500318 A | 1/2003 |
| JP | 2003-86181 A | 3/2003 |
| JP | 2003-109599 A | 4/2003 |
| JP | 2003-203631 A | 7/2003 |
| JP | 2003-221234 A | 8/2003 |
| JP | 2004-31165 A | 1/2004 |
| JP | 2004-47180 A | 2/2004 |
| JP | 2004-47437 A | 2/2004 |
| JP | 2004-103566 A | 4/2004 |
| JP | 2005-129489 A | 5/2005 |

OTHER PUBLICATIONS

Lu, Zhonghua et al., *Layered Li[$Ni_xCo_{1-2x}Mn_x$]$O_2$ Cathode Materials for Lithium-Ion Batteries*, Electrochemical and Solid-State Letters, vol. 4 (12) pp. A200-A203(2001).

Koyama, Yukinor, et al., "Lithium Insertion Material of $LiCo_{1/3}Ni_{1/3}Mn_{1/3}O_2$ for Advanced Batteries; (I) Prediction on the Crystal and Electronic Structure", *The 42$^{nd}$ Battery Symposium in Japan*, The Committee of Battery Technology, Nov. 21-23, 2001, Yokohama pp. 50-51.

* cited by examiner

F I G. 3
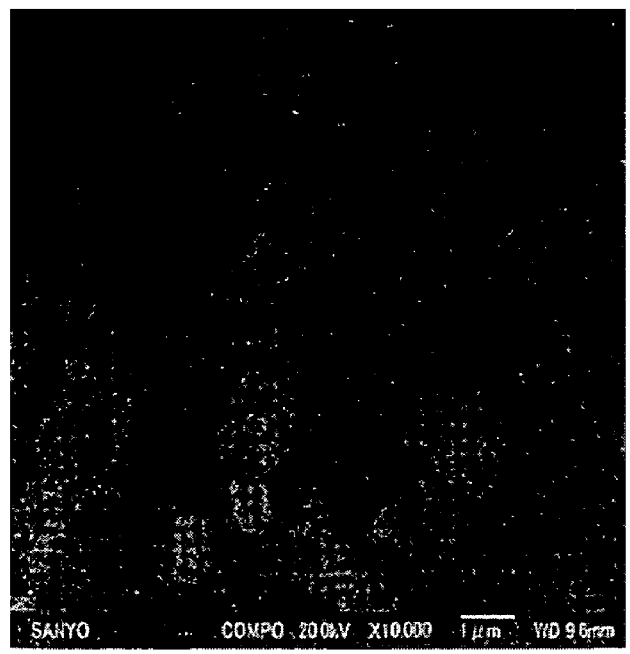
F I G. 4
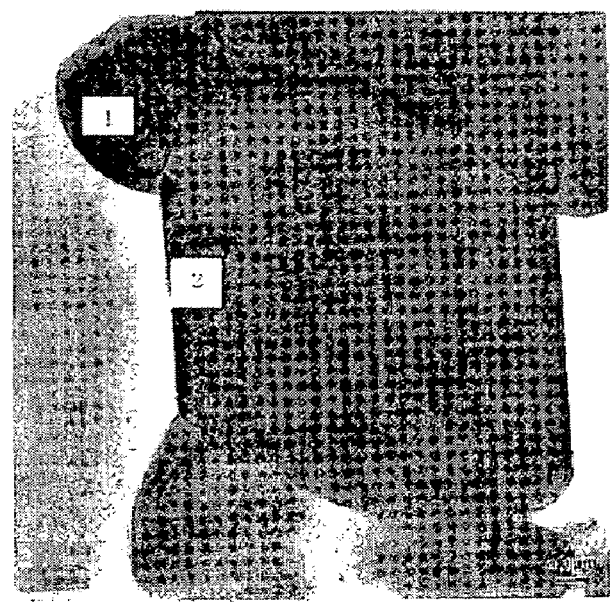

NONAQUEOUS ELECTROLYTE SECONDARY BATTERY

BACKGROUND OF THE INVENTION

1. Field of the Invention

The present invention relates to a nonaqueous electrolyte secondary battery such as a lithium secondary battery.

2. Description of the Related Art

In recent years, a nonaqueous electrolyte secondary battery, in which an alloy, metal lithium or a carbon material capable of occluding/releasing lithium ions is used as a negative active material and a lithium transition metal complex oxide expressed by a chemical formula $LiMO_2$ (M is a transition metal) is used as a positive active material, is noted as a battery having a high energy density.

As the above-mentioned lithium transition metal complex oxide, a lithium cobalt complex oxide ($LiCoO_2$) is given as a typical one, and it has already become commercially practical as a positive active material of the nonaqueous electrolyte secondary battery.

In the nonaqueous electrolyte secondary battery in which a lithium transition metal complex oxide such as lithium cobalt oxide is used as a positive active material and a carbon material is used as a negative active material, 4.1 to 4.2 V is generally employed as the end of charge voltage. In this case, the positive active material is utilized only by 50 to 60% with respect to its theoretical capacity. Therefore, if the end of charge voltage is more raised, a capacity (coefficient of use) of a positive electrode can be improved and the capacity and the energy density of the battery can be enhanced.

However, if the end of charge voltage of the battery is raised, the deterioration of a structure of $LiCoO_2$ and the decomposition of an electrolyte solution at the surface of the positive electrode become apt to occur. Therefore, there was a problem that the deterioration of the battery due to charge-discharge cycles becomes more remarkable than the conventional case of employing 4.1 to 4.2 V as the end of charge voltage.

On the other hand, of lithium transition metal complex oxides expressed by a chemical formula $LiMO_2$ (M represents transition metals), compounds containing Mn and Ni as transition metals have been studied and also materials containing all three kinds of transition metals of Mn, Ni and Co have been actively studied as shown in Japanese Patent Publication No. 2561556, Japanese Patent Publication No. 3244314 and Journal of Power Sources 90 (2000) 176-181.

It is reported that among the lithium transition metal complex oxides containing Mn, Ni and Co, a compound in which compositions of Mn and Ni are equal exhibits specifically high thermal stability even in a charging state (high oxidation state) in Electrochemical and Solid-State Letters, 4(12) A200-A203 (2001). Also, it is reported that a complex oxide, in which Mn is substantially equal to Ni, has a voltage of around 4V equal to that of $LiCoO_2$ and exhibits a high capacity and excellent charge-discharge efficiency in Japanese Patent Laid-Open No. 2002-42813.

In such a battery in which a lithium transition metal complex oxide containing Mn, Ni and Co and having a layered structure is used as a positive active material, it can be expected that reliability of the battery is dramatically improved by virtue of high thermal stability during charging even when the end of charge voltage of the battery is raised to deepen the depth of charge capacity of a positive electrode.

However, the present inventors studied on a battery in which the lithium transition metal complex oxide containing Mn, Ni and Co is used as a positive active material and as a result have found that when the end of charge voltage is raised, the deterioration of a structure of the positive active material and the decomposition of an electrolyte solution at the surface of the positive electrode become apt to occur and reduction in a battery capacity due to the charge-discharge cycles becomes more remarkable than the conventional case of employing 4.1 to 4.2 V as the end of charge voltage.

In order to solve the above-mentioned problems, the present applicant has proposed in patent application No. 2004-94475 not laid open that a lithium transition metal complex oxide formed by allowing $LiCoO_2$ to contain at least both of Zr and Mg and a lithium transition metal complex oxide having a layered structure and containing at least both of Mn and Ni as transition metals are mixed and this mixture is used as a positive active material. By using such a mixture as a positive active material, the end of charge voltage can be raised to enhance a charge-discharge capacity without deteriorating a charge-discharge cycle characteristic and thermal stability. The present invention is one which further improves a charge-discharge cycle characteristic in the nonaqueous electrolyte secondary battery in which such the mixture is used as the positive active material.

SUMMARY OF THE INVENTION

It is an object of the present invention to provide a nonaqueous electrolyte secondary battery in which an end of charge voltage can be raised without deteriorating a charge-discharge cycle characteristic and thermal stability, and thereby a charge-discharge capacity can be enhanced.

The present invention pertains to a nonaqueous electrolyte secondary battery comprising a positive electrode containing a positive active material, a negative electrode containing a negative active material and a nonaqueous electrolyte and is characterized in that a lithium transition metal complex oxide A formed by allowing $LiCoO_2$ to contain at least both of Zr and Mg and a lithium transition metal complex oxide B having a layered structure and containing at least both of Mn and Ni as transition metals and containing molybdenum (Mo) are mixed and used as the above-mentioned positive active material.

The reason why the charge-discharge cycle characteristic is deteriorated in using a conventional $LiCoO_2$ as a positive active material and raising the end of charge voltage to 4.3 V or higher is not clear in detail, but it is assumed that the deterioration of the charge-discharge cycle characteristic results from decomposition of an electrolyte solution, generated by a catalytic action of Co of which oxidation state is enhanced during charging on the surface of an active material, and destruction of a crystal structure of $LiCoO_2$. It is considered that by allowing $LiCoO_2$ to contain Zr and Mg, the oxidation state of Co is changed and the decomposition of an electrolyte solution or the destruction of a crystal structure of $LiCoO_2$ is reduced in the lithium transition metal complex oxide A in the present invention.

As described above, the lithium transition metal complex oxide A exhibits a good charge-discharge cycle characteristic even when the end of charge voltage is enhanced. On the other hand, the lithium transition metal complex oxide B exhibits high thermal stability. In the present invention, by mixing and using such the lithium transition metal complex oxide A and the lithium transition metal complex oxide B, it is possible to form a positive active material having both of the excellent cycle characteristic of the lithium transition metal complex oxide A and the excellent thermal stability of the lithium transition metal complex oxide B.

Further, the lithium transition metal complex oxide B in the present invention contains molybdenum (Mo). It is considered that by containing molybdenum in the lithium transition metal complex oxide B, the elution of Mn from the surface of a positive electrode is inhibited to thereby reduce the deterioration of a battery capacity, so that the charge-discharge cycle characteristic can be significantly improved. Generally, it is considered that in a compound expressed by $Li_a Mn_b Ni_b Co_{(1-2b)} O_2$, where a and b are numerals satisfying equations of $0 \leq a \leq 1.1$ and $0 < b \leq 0.5$, an oxidation number of Mn is four ($Mn^{4+}$) and an oxidation state of Mn does not change during charging and discharging (Abstracts of The 42nd Battery Symposium in Japan, p. 50-51). But, it is considered that when the' potential of a positive electrode is decreased by a large amount, a part of $Mn^{4+}$ in the positive electrode is reduced to give unstable $Mn^{3+}$ and this $Mn^{3+}$ disproportionates to produce $Mn^{4+}$ and $Mn^{2+}$. Since the $Mn^{2+}$ tends to form complexes with a solvent composing an electrolyte solution to dissolve, it is considered that the $Mn^{2+}$ is eluted from the surface of the positive electrode and deposited on a negative electrode. It is assumed that a crystal structure of the surface of the lithium transition metal complex oxide B collapses due to such an elution of Mn from the surface of a positive electrode and therefore the deterioration of a battery capacity has occurred. It is considered that in the present invention, since molybdenum is contained in the lithium transition metal complex oxide B, such the elution of Mn from the surface of a positive electrode is inhibited.

The content of molybdenum in the lithium transition metal complex oxide B is preferably within the range of 0.1 to 5 mol % with respect to the total amount of transition metals other than Mo in the lithium transition metal complex oxide B. When the content of Mo is too small, there may be cases where an effect of improving the charge-discharge cycle characteristic is not adequately attained. And, when it is too much, this may have a detrimental effect on a discharge characteristic of the positive electrode.

It is preferred that the lithium transition metal complex oxide B contains Co as transition metals and further an amount of Mn is substantially equal to that of Ni. Preferably, the amount of Mn and the amount of Ni in the lithium transition metal complex oxide B are substantially equal in order to have the best balance between the property of Mn, in which a capacity is small but thermal stability during charging is high, and the property of Ni, in which a capacity is large but thermal stability during charging is low.

As the lithium transition metal complex oxide B, there can be given, for example, a compound expressed by $Li_b Mn_s Ni_t Co_u Mo_v O_2$, where b, s, t, u and v are numerals satisfying equations of $0 < b \leq 1.2$, $s+t+u=1$, $0 < s \leq 0.5$, $0 < t \leq 0.5$, $u \geq 0$ and $0.001 \leq v \leq 0.05$.

As the lithium transition metal complex oxide A, there can be given, for example, a compound expressed by $Li_a Co_{1-x-y-z} Zr_x Mg_y M_z O_2$, where M is at least one element selected from Al, Ti and Sn and a, x, y and z are numerals satisfying equations of $0 < a \leq 1.1$, $x > 0$, $y > 0$, $z \geq 0$ and $0 < x+y+z \leq 0.03$. More preferably, in the above formula, M is Al and $z > 0$. It is considered that by adding Al to the lithium transition metal complex oxide A, the oxidation state of Co is changed and the deterioration of a battery due to the oxidative decomposition of an electrolyte solution and others can be inhibited.

In the present invention, it is preferred that Zr adheres to the surface of the lithium transition metal complex oxide A as a compound. That is, it is preferred that Zr is contained in the lithium transition metal complex oxide A through the adhesion of a compound of Zr to the surface of the lithium transition metal complex oxide A. And, it is preferred that the compound of Zr adheres to the surface of the lithium transition metal complex oxide A in the form of a particle. The adhesion of Zr to the surface of the lithium transition metal complex oxide A is considered not to contribute to stabilization of a crystal structure of the lithium transition metal complex oxide A but to facilitate the delivery and receipt of lithium ions and electrons at the surface of the lithium transition metal complex oxide A during charging and discharging and to enable to inhibit the oxidative decomposition of an electrolyte solution, which is a degrading reaction.

And, it is verified that when Mg is added, Mg elements are diffused into both of the compound containing Zr and the lithium transition metal complex oxide A and simultaneously the compound containing Zr and the lithium transition metal complex oxide A are sintered in a robust state. Accordingly, it is considered that the addition of Mg strengthens a joining state between the compound containing Zr and the lithium transition metal complex oxide A and substantially increases an effect of inhibiting the decomposition of an electrolyte solution.

A proportion of the positive active material which the lithium transition metal complex oxide A makes up is preferably within the range of 51 to 90 weight %. Therefore, a proportion of the lithium transition metal complex oxide B is preferably within the range of 49 to 10 weight %. By setting the above proportion within this range, both of the charge-discharge cycle characteristic and the thermal stability of the battery can be attained.

In the present invention, when a battery capacity is enhanced by raising the end of charge voltage, the ratio between charge capacities of the opposite portions in the positive electrode and the negative electrode (negative electrode charge capacity/positive electrode charge capacity) at an end of charge voltage to be a design basis is preferably within the range of 1.0 to 1.2. By setting the ratio between charge capacities of the positive electrode and the negative electrode at 1.0 or more like this, it is possible to prevent metal lithium from depositing on the surface of the negative electrode. That is, the ratio between charge capacities of the opposite portions in the positive electrode and the negative electrode (negative electrode charge capacity/positive electrode charge capacity) is preferably within the range of 1.0 to 1.2 in designing the end of charge voltage either to be 4.3 V or to be 4.4 V. Further, the negative active material in this case is an active material other than metal lithium. In addition, when the end of charge voltage is higher than 4.4 V, an effect of inhibiting the decomposition of an electrolyte solution or the destruction of a positive electrode becomes insufficient, and therefore the end of charge voltage is preferably 4.4 V or lower.

As the negative active material in the present invention, a compound which can be employed as a negative active material in a lithium secondary battery may be used but particularly a graphite material is preferably used. Since the graphite material exhibits excellent reversibility compared with the negative active materials such as metal lithium and lithium alloy, it is the most preferable negative active material in the present invention.

As a solvent of the nonaqueous electrolyte used in the present invention, there can be used a substance which has been previously used as a solvent of an electrolyte of a lithium secondary battery. Among others, a mixed solvent of a cyclic carbonate and a chain carbonate is particularly preferably used. As the cyclic carbonate, there are given ethylene carbonate, propylene carbonate, butylene carbonate, vinylene carbonate, and the like. As the chain carbonate, there are given dimethyl carbonate, ethyl methyl carbonate, diethyl carbonate and the like.

Since the cyclic carbonate generally tends to decompose at a high potential, a proportion of the cyclic carbonate in the solvent is preferably within the range of 10 to 50% by volume when the battery is charged at a high voltage of 4.3 V or higher. When the graphite material is used as the negative active material, ethylene carbonate (EC) is preferably used as the cyclic carbonate. However, since ethylene carbonate tends to decompose at a high potential, propylene carbonate and/or butylene carbonate, which is resistant to oxidative decomposing, may be employed instead of ethylene carbonate in order to inhibit the decomposition at a high potential. Further, a ratio of the cyclic carbonate such as ethylene carbonate to be mixed may be reduced.

As a solute of the nonaqueous electrolyte in the present invention, there can be used lithium salts generally used as a solute in the lithium secondary battery. As such a lithium salt, there are exampled $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $LiAsF_6$, $LiClO_4$, $Li_2B_{10}Cl_{10}$, $Li_2B_{12}Cl_{12}$, and mixtures thereof. Among them, $LiPF_6$ (lithium hexafluorophosphate) is preferably used. When the battery is charged at a high charge voltage, aluminum which is a collector of the positive electrode becomes apt to dissolve but if $LiPF_6$ exists, a coating is formed on the surface of aluminum through decomposition of $LiPF_6$ and this coating can inhibits the dissolution of aluminum. Accordingly, it is preferred to use $LiPF_6$ as a lithium salt.

And, in the present invention, the positive electrode may contain a conductive material. When a carbon material is contained as a conductive material, the content of the carbon material is preferably 5 weight % or lower with respect to the total of the positive active material, the conductive material and the binder. The reason for this is that the electrolyte solution is apt to decompose on the surface of the carbon material in charging at a particularly high end of charge voltage.

By mixing and using the lithium transition metal complex oxide A and the lithium transition metal complex oxide B as the positive active material in accordance with the present invention, the end of charge voltage can be enhanced without deteriorating a charge-discharge cycle characteristic and thermal stability, and thereby a charge-discharge capacity of the nonaqueous electrolyte secondary battery can be enhanced.

And, since molybdenum is contained in the lithium transition metal complex oxide B in the present invention, it is possible to further improve the charge-discharge cycle characteristic.

BRIEF DESCRIPTION OF THE DRAWINGS

FIG. 3 shows a backscattered-electron image of a scanning electron microscope (SEM) of $LiCo_{0.99}Zr_{0.005}Mg_{0.005}O_2$ (a scale in the drawing represents 1 μm), FIG. 4 shows an image of a transmission electron microscope (TEM) of $LiCo_{0.99}Zr_{0.005}Mg_{0.005}O_2$ (a scale in the image represents 0.1 μm)

DETAILED DESCRIPTION OF THE PREFERRED EMBODIMENTS

Figure 1:
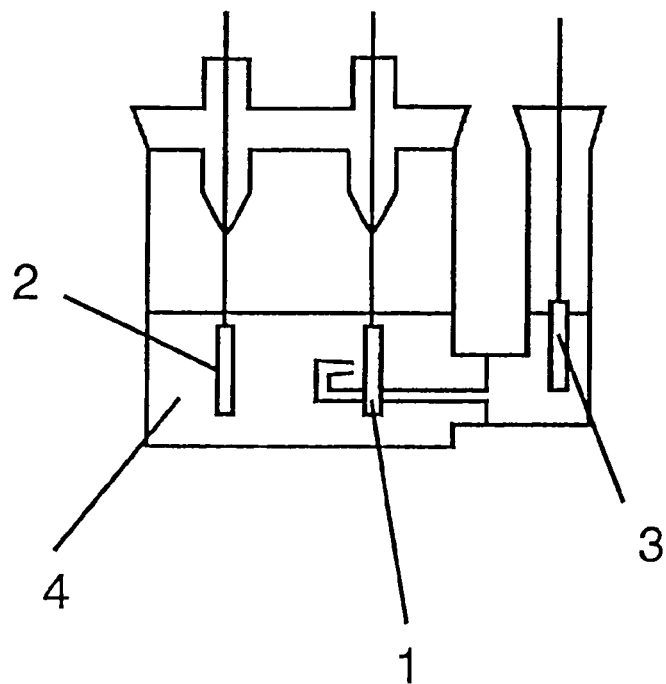
FIG. 1 is a schematic view showing a three-electrode beaker cell.

Hereinafter, the present invention will be described in more detail by way of examples, but the present invention is not limited by the following examples and can be appropriately modified to embody as long as its gist is not modified.

EXPERIMENT 1

Example 1

Preparation of $LiCo_{0.993}Zr_{0.002}Mg_{0.005}O_2$ $Li_2CO_3$, $Co_3O_4$, $ZrO_2$ and MgO were mixed in an Isikawa type grinding mortar in such a way that a molar ratio among Li, Co, Zr and Mg is 100:99.3:0.2:0.5 and then the mixture was heat treated at 850° C. for 24 hours in an air atmosphere, and then the heat-treated mixture was milled to obtain $LiCo_{0.993}Zr_{0.002}Mg_{0.005}O_2$ having an average particle diameter of about 14 μm.

[Preparation of $LiMn_{0.33}Ni_{0.33}Co_{0.34}Mo_{0.01}O_2$]

LiOH, coprecipitation hydroxide expressed by $Mn_{0.33}Ni_{0.33}Co_{0.34}(OH)_2$ and molybdenum oxide (VI) were mixed in an Isikawa type grinding mortar in such a way that a molar ratio among Li, overall transition metals other than Li and Mo, and Mo is 1:1:0.01 and then the mixture was heat treated at 1,000° C. for 20 hours in an air atmosphere, and then the heat-treated mixture was milled to obtain $LiMn_{0.33}Ni_{0.33}Co_{0.34}Mo_{0.01}O_2$ having an average particle diameter of about 5 μm.

Preparation of Positive Electrode $LiCo_{0.993}Zr_{0.002}Mg_{0.005}O_2$ and $LiMn_{0.33}Ni_{0.33}Co_{0.34}Mo_{0.01}O_2$ thus obtained were mixed in an Isikawa type grinding mortar in such a way that a weight ratio between these two compounds is 8:2 to obtain a positive active material. Next, poly vinylidene fluoride as a binder was dissolved in N-methyl-2-pyrrolidone as a dispersing medium and to this solution, the positive active material and carbon as a conductive material were further added in such a way that the weight ratio among the active material, the conductive material and the binder is 90:5:5 and the resulting mixture was kneaded to prepare slurry for a positive electrode. After the prepared slurry was applied onto an aluminum foil as a collector, it was dried and then rolled out with a roller for rolling, and a positive electrode was fabricated by attaching a collecting tab to the rolled out slurry.

Preparation of Negative Electrode

To a solution formed by dissolving carboxymethylcellulose as a thickner in water, artificial graphite as a negative active material and a styrene butadiene rubber as a binder were added in such a way that the weight ratio among the active material, the binder and the thickner is 95:3:2 and then the resulting mixture was kneaded to prepare slurry for a negative electrode. After the prepared slurry was applied onto a copper foil as a collector, it was dried and then rolled out with a roller for rolling, and a negative electrode was fabricated by attaching a collecting tab to the rolled out slurry.

[Preparation of Electrolyte Solution]

Ethylene carbonate (EC), ethyl methyl carbonate (EMC) and diethyl carbonate (DEC) were mixed so as to be 3:6:1 in a volumetric ratio to form a solvent and in this solvent, lithium hexafluorophosphate ($LiPF_6$) was dissolved so as to be 1 mol/l in its concentration. To this solution, vinylene carbonate (VC) was added in the proportion of 2.0 parts by weight with respect to 98 parts by weight of this solution and the mixture was dissolved to prepare an electrolyte solution.

Fabrication of Battery

The positive electrode and the negative electrode thus obtained were taken up so as to be placed on opposite sides of a separator to prepare a roll, and a nonaqueous electrolyte secondary battery A1, which had a design capacity of 800 mAh and had a size of 3.6 mm thick×3.5 cm wide×6.2 cm high as a battery standardized size, was obtained by encapsulating the roll together with an electrolyte solution in an aluminum laminate in a glove box under an atmosphere of argon.

Here, amounts of the positive active material and the negative active material used were determined in such a way that the ratio between charge capacities of the opposite portions in the positive electrode and the negative electrode (negative electrode charge capacity/positive electrode charge capacity) in the case where 4.4 V was selected as an end of charge voltage was 1.15. In addition, this ratio between charge capacities of the positive electrode and the negative electrode is similarly used in the following Examples, Comparative Examples and reference batteries Y1 and Y2.

Evaluation of Charge-Discharge Cycle Characteristic

The nonaqueous electrolyte secondary battery A1 was charged at a constant current of 800 mA at room temperature until a voltage reaches 4.4 V and further charged at a constant voltage of 4.4 V until a current value reaches 40 mA and then discharged at a constant current of 800 mA until a voltage reaches 2.75 V, and thereby a discharge capacity (mAh) of the battery was measured. By repeating this charge and discharge, the charge-discharge cycle characteristic was evaluated. The results of evaluation are shown in Table 1.

Capacity retention was determined from the following equation.

Capacity retention (%)=(discharge capacity at 250th cycle)/(discharge capacity at first cycle)×100

Comparative Example 1

A nonaqueous electrolyte secondary battery X1 was fabricated by following the same procedure as in Example 1 except for mixing LiOH and coprecipitation hydroxide expressed by $Mn_{0.33}Ni_{0.33}Co_{0.34}(OH)_2$ in an Isikawa type grinding mortar in such a way that a molar ratio between Li and overall transition metals is 1:1 without using molybdenum oxide in the above Preparation of $LiMn_{0.33}Ni_{0.33}Co_{0.34}Mo_{0.01}O_2$ in Example 1, and the charge-discharge cycle characteristic of the battery X1 was evaluated. The results of evaluation are shown in Table 1.

Example 2

A nonaqueous electrolyte secondary battery A2 was fabricated by using 4.2 V as an end of charge voltage in Example 1 and following the same procedure as in Example 1. The charge-discharge cycle characteristic of this battery was evaluated by following the same procedure as in Example 1 except for charging this battery at a constant current of 800 mA until a voltage reaches 4.2 V and further charging it at a constant voltage of 4.2 V until a current value reaches 40 mA in evaluation of charge-discharge cycle characteristic. The results of evaluation are shown in Table 1.

Comparative Example 2

A nonaqueous electrolyte secondary battery X2 was fabricated by using 4.2 V as an end of charge voltage in Comparative Example 1 and following the same procedure as in Comparative Example 1. The charge-discharge cycle characteristic was evaluated in a charge-discharge condition similar to that of Example 2 on this battery. The results of evaluation are shown in Table 1.

Example 3

Preparation of $LiCo_{0.978}Zr_{0.002}Mg_{0.01}Al_{0.01}O_2$ $LiCo_{0.978}Zr_{0.002}Mg_{0.01}Al_{0.01}O_2$ was obtained by following the same procedure as in Example 1 except for mixing $Li_2CO_3$, $Co_3O_4$, $ZrO_2$, MgO and $Al_2O_3$ in an Isikawa type grinding mortar in such a way that a molar ratio among Li, Co, Zr, Mg and Al is 100:97.8:0.2:1.0:1.0.

Fabrication of Battery

A nonaqueous electrolyte secondary battery A3 was fabricated by following the same procedure as in Example 1 except for mixing the obtained $LiCo_{0.978}Zr_{0.002}Mg_{0.01}Al_{0.01}O_2$ and $LiMn_{0.33}Ni_{0.33}Co_{0.34}Mo_{0.01}O_2$ so as to have a weight ratio of 8:2, and the charge-discharge cycle characteristic of the battery A3 was evaluated. The results of evaluation are shown in Table 1.

Example 4

A nonaqueous electrolyte secondary battery A4 was fabricated by following the same procedure as in Example 3 except for mixing the $LiCo_{0.978}Zr_{0.002}Mg_{0.01}Al_{0.01}O_2$ and the $LiMn_{0.33}Ni_{0.33}Co_{0.34}Mo_{0.01}O_2$ so as to have a weight ratio of 7:3 in the fabrication of battery, and the charge-discharge cycle characteristic of the battery A4 was evaluated. The results of evaluation are shown in Table 1.

TABLE 1

| Battery | | Al in Lithium Transition Metal Complex Oxide A | Mo in Lithium Transition Metal Complex Oxide B | Charge–Discharge Voltage (V) | Initial Capacity (mAh) | Capacity after 250 Cycles (mAh) | Capacity Retention after 250 Cycles |
|---|---|---|---|---|---|---|---|
| Example 1 | A1 | None | present | 4.4~2.75 | 831.1 | 691.8 | 83.2% |
| Example 3 | A3 | Present | Present | 4.4~2.75 | 819.0 | 695.4 | 84.9% |
| Example 4 | A4 | Present | Present | 4.4~2.75 | 812.2 | 689.4 | 84.9% |
| Comparative Example 1 | X1 | None | None | 4.4~2.75 | 828.9 | 471.8 | 56.9% |
| Example 2 | A2 | None | Present | 4.2~2.75 | 711.1 | 609.5 | 85.7% |
| Comparative Example 2 | X2 | None | None | 4.2~2.75 | 685.9 | 610.0 | 88.9% |

As is apparent from the results shown in Table 1, it is found that the battery A1 of Example 1, the battery A3 of Example 3 and the battery A4 of Example 4, according to the present invention, and the battery X1 of Comparative Example 1 have higher end of charge voltages and therefore have larger capacities than the battery A2 of Example 2 and the battery X2 of Comparative Example 2. And, it is found from a comparison between Example 1 and Comparative Example 1 that the post-cycle capacity retention of the battery A1 of Example 1 is superior to the battery X1 of Comparative Example 1. Therefore, it is found that the cycle characteristic is improved by allowing the lithium transition metal complex oxide B to contain molybdenum according to the present invention.

Further, it is found from a comparison between Example 1 and Example 3 that the post-cycle capacity retention of the battery A3 of Example 3 is superior to the battery A1 of Example 1. Therefore, it is found that the cycle characteristic is further improved by allowing the lithium transition metal complex oxide A to contain aluminum.

[Evaluation of Amount of Mn Deposited on Negative Electrode]

After the charge-discharge cycles, the battery A1 of Example 1 and the battery X1 of Comparative Example 1 were disassembled and the negative electrodes were recovered, and the deposition of Mn on the surface of the negative electrode was measured using a X-ray fluorescence analysis employing rhodium as a radiation source. A range of detection is 0 to 40 keV. The results of measurement are shown in Table 2.

TABLE 2

| Battery | | Mo in Lithium Transition Metal Complex Oxide B | Charge–Discharge Voltage (V) | Amount of Mn Deposited on Negative Electrode (cps/μA) |
|---|---|---|---|---|
| Example 1 | A1 | Present | 4.4~2.75 | 0.313 |
| Comparative Example 1 | X1 | None | 4.4~2.75 | 0.464 |

As is apparent from the results shown in Table 2, it is found that in Example 1 in which the lithium transition metal complex oxide B containing molybdenum was used, an amount of Mn deposited on the negative electrode after the charge-discharge cycles is less than that of Comparative Example 1, in which molybdenum is not contained, by 30% or more.

EXPERIMENT 2

An effect of improving the thermal stability by mixing $LiMn_{0.33}Ni_{0.33}Co_{0.34}O_2$ was investigated. By the way, here, a reference battery Y1 described below, which contains the lithium transition metal complex oxide B not containing molybdenum as a positive active material was fabricated and used.

Preparation of Reference Battery Y1

A reference battery Y1 was fabricated by following the same procedure as in Comparative Example 1 except for changing an amount of an active material per areas of the positive electrode and the negative electrode in the preparation of a positive electrode and the preparation of a negative electrode to prepare a battery which had a design capacity of 650 mAh at 4.4 V charge and using a solution, which is formed by dissolving $LiPF_6$ in a solvent, formed by mixing ethylene carbonate (EC) and diethyl carbonate (DEC) in a volumetric ratio of 3:7, so as to be 1 mol/l in its concentration, for an electrolyte solution.

[Preparation of Reference Battery Y2]

A nonaqueous electrolyte secondary battery Y2 was fabricated by following the same procedure as in the preparation of reference battery Y1 except for using only $LiCo_{0.993}Zr_{0.002}Mg_{0.005}O_2$ as a positive active material.

[Evaluation of Thermal Stability]

The reference batteries Y1 and Y2 were charged at a constant current of 650 mA at room temperature until a voltage reaches 4.45 V and further charged at a constant voltage of 4.45 V until a current value reaches 32 mA. Then, these batteries were heated at a temperature rising rate of 5° C./minute from room temperature to a set temperature and maintained at the set temperature for 2 hours, and thereby the thermal stability was evaluated. The results of evaluation are shown in Table 3.

TABLE 3

| Battery | Ratio of $LiMn_{0.33}Ni_{0.33}Co_{0.34}O_2$ Mixed in Positive Active Material | Thermal Stability | | |
|---|---|---|---|---|
| | | 160° C. | 170° C. | 180° C. |
| Reference Battery | Y1 | 20% | — | Normal | Ignition |
| Reference Battery | Y2 | 0% | Normal | Ignition | — |

As is apparent from the results shown in Table 3, it is found that by mixing $LiMn_{0.33}Ni_{0.33}Co_{0.34}O_2$ into $LiCo_{0.993}Zr_{0.002}Mg_{0.005}O_2$, the thermal stability is improved.

EXPERIMENT 3

The thermal stability of $LiMn_{0.33}Ni_{0.33}Co_{0.34}Mo_{0.01}O_2$ was evaluated by preparing a three-electrode beaker cell. Here, the lithium transition metal complex oxide B containing molybdenum was compared with the lithium transition metal complex oxide B not containing molybdenum.

Preparation of Working Electrode

Carbon as a conductive material, poly vinylidene fluoride as a binder and N-methyl-2-pyrrolidone as a dispersing medium were added to $LiMn_{0.33}Ni_{0.33}Co_{0.34}Mo_{0.01}O_2$ obtained by following the same procedure as in Example 1 in such a way that the weight ratio among the active material, the conductive material and the binder is 90:5:5 and then the resulting mixture was kneaded to prepare slurry for a positive electrode. After the prepared slurry was applied onto an aluminum foil as a collector, it was dried and then rolled out with a roller for rolling, and a working electrode was fabricated by attaching a collecting tab to the rolled out slurry.

Preparation of Electrolyte Solution

Ethylene carbonate (EC) and ethyl methyl carbonate (EMC) were mixed in a volumetric ratio of 3:7 to form a solvent and in this solvent, lithium hexafluorophosphate was dissolved so as to be 1 mol/l in its concentration to prepare an electrolyte solution.

Preparation of Three-Electrode Beaker Cell (Reference Battery Y3)

A three-electrode beaker cell Y3 shown in FIG. 1 was prepared in a glove box under an atmosphere of argon. As shown in FIG. 1, an electrolyte solution 4 was put in the beaker and a working electrode 1, a counter electrode 2 and a reference electrode 3 are inserted into the electrolyte solution 4. As the counter electrode 2 and the reference electrode 3, metal lithium is used.

Evaluation of Thermal Stability

The beaker cell Y3 was charged at a constant current of 0.75 mA/cm$^2$ (about 0.3 C) at room temperature until the potential of the working electrode reaches 4.5 V (vs.Li/Li$^+$) and further charged at a constant current of 0.25 mA/cm$^2$ (about 0.1 C) until the potential reaches 4.5 V (vs.Li/Li$^+$). After charge, the beaker cell was disassembled, and the working electrode was cleaned in MEC and then dried in a vacuum. 3 mg of a portion of the working electrode shaved off and 2 mg of EC were put in an aluminum DSC cell to prepare a DSC sample. DSC measurement was carried out by measuring the prepared sample at a temperature rising rate of 5° C./minute in the range of from room temperature to 350° C. using alumina as a reference. The results of measurement are shown in Table 2.

Preparation of Reference Battery Y4

A three-electrode beaker cell Y4 was prepared by following the same procedure as the above procedure except for using $LiMn_{0.33}Ni_{0.33}Co_{0.34}O_2$ obtained by following the same procedure as in Comparative Example 1 as a positive active material and the thermal stability of the battery Y4 was evaluated by DSC measurement as with the above procedure. The results of evaluation are shown in FIG. 2.

Figure 2:
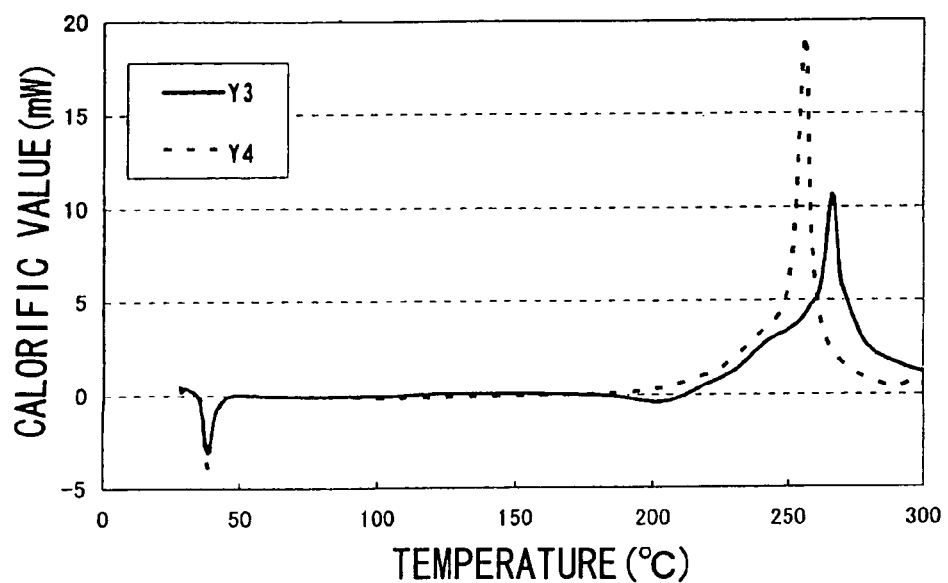
FIG. 2 shows a graph of the results of measurement of DSC (differential scanning calorimeter) of a lithium transition metal complex oxide B containing molybdenum and a lithium transition metal complex oxide B not containing molybdenum.

As is apparent from FIG. 2, it is found that the battery Y3, in which molybdenum is contained in the lithium transition metal complex oxide B, has an exothermic peak resulting from a reaction with ethylene carbonate (EC), which has been shifted to a higher temperature side than the battery Y4 not containing molybdenum, and therefore has excellent thermal stability.

From the results described above, it is found that the lithium transition metal complex oxide B containing molybdenum has the thermal stability equal to or higher than that of the lithium transition metal complex oxide B not containing molybdenum. Therefore, as is apparent from Experiment 2, it is found that better thermal stability can be attained by mixing the lithium transition metal complex oxide B containing molybdenum and the lithium transition metal complex oxide A to use as a positive active material.

EXPERIMENT 4

The lithium transition metal complex oxide A was observed by an electron microscope.

[Preparation of $LiCo_{0.99}Zr_{0.005}Mg_{0.005}O_2$]

$Li_2CO_3$, $Co_3O_4$, $ZrO_2$ and MgO were mixed in an Isikawa type grinding mortar in such a way that a molar ratio among Li, Co, Zr and Mg is 100:99:0.5:0.5 and then the mixture was heat treated at 850° C. for 24 hours in an air atmosphere, and then the heat-treated mixture was milled to obtain $LiCo_{0.99}Zr_{0.005}Mg_{0.005}O_2$ having an average particle diameter of about 14 μm.

[Observation by Electron Microscope]

The resulting $LiCo_{0.99}Zr_{0.005}Mg_{0.005}O_2$ was observed by an electron microscope.

FIG. 3 is a backscattered-electron image of a scanning electron microscope (SEM) of $LiCo_{0.99}Zr_{0.005}Mg_{0.005}O_2$ and FIG. 4 is an image of a transmission electron microscope (TEM) of $LiCo_{0.99}Zr_{0.005}Mg_{0.005}O_2$. As is apparent from FIG. 3 and FIG. 4, small particles adhere to the surfaces of large particles.

Figure 5:
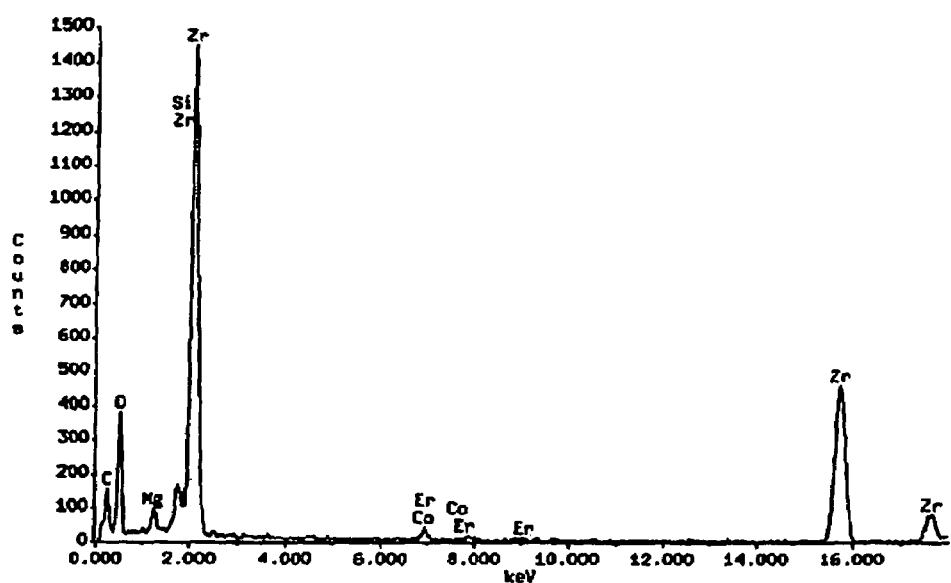
FIG. 5 shows a graph of the results of measurement of energy-dispersive X-ray spectroscopy (EDS) at the spot 1 in FIG. 4
Figure 6:
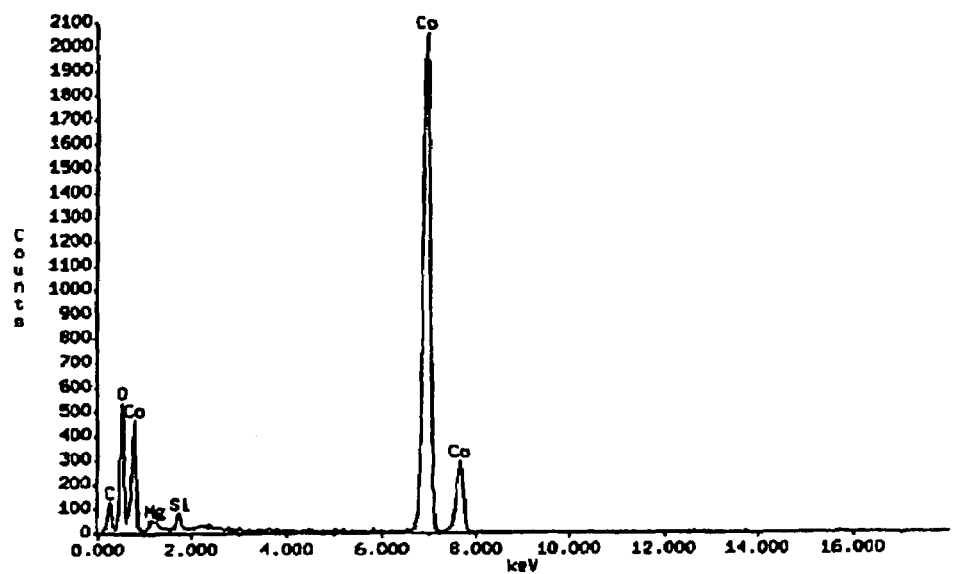
FIG. 6 shows a graph of the results of measurement of EDS at the spot 2 in FIG. 4.

The qualification of metal elements contained in the image of a transmission electron microscope (TEM) shown in FIG. 4 was evaluated by EDS (energy-dispersive X-ray spectroscopy). The results of measurement of EDS are shown in FIG. 5 and FIG. 6. FIG. 5 shows a graph of measurement of EDS at the spot 1 in FIG. 4 and FIG. 6 shows a graph of measurement of EDS at the spot 2 in FIG. 4. As is apparent from FIG. 5 and FIG. 6, in the TEM image of FIG. 4, a Co element is hardly detected and a Zr element is much detected at the spot 1. On the other hand, at the spot 2, the Zr element is not detected at all and the Co element is much detected. From this, it is found that the adhering particles of the spot 1 are particles of a compound containing Zr and the adhering particles of the spot 2 are particles of $LiCoO_2$ not containing Zr. That is, it is found that the surface of the $LiCoO_2$ particle is in a state that particles of a compound of Zr adhere to a part of the surface and most (80% or more) of the surface is exposed.

And, as is apparent from FIG. 5 and FIG. 6, Mg element is detected in both of the spot 1 and the spot 2. Therefore, it is found that Mg elements are diffused into and contained in both of the particles of a compound of Zr and the $LiCoO_2$ particles.

What is claimed is:

1. A nonaqueous electrolyte secondary battery comprising a positive electrode containing a positive active material, a negative electrode containing a negative active material and a nonaqueous electrolyte, wherein a lithium transition metal complex oxide A formed by allowing $LiCoO_2$ to contain at least both of Zr and Mg, and which is expressed by a chemical formula:

$Li_aCo_{1-x-y-z}Zr_xMg_yM_zO_2$, where M is at least one element selected from Al, Ti and Sn and a, x, y, and z are numerals satisfying equations of $0<a\leq1.1$, $x>0$, $y>0$, $z\geq0$ and $0<x+y+z\leq0.03$, and a lithium transition metal complex oxide B having a layered structure and containing at least both of Mn and Ni as transition metals and containing molybdenum (Mo) are mixed and used as said positive active material.

2. The nonaqueous electrolyte secondary battery according to claim 1, wherein M is Al and $z>0$ in said chemical formula.

3. The nonaqueous electrolyte secondary battery according to claim 1, wherein Zr is contained in said lithium transition metal complex oxide A by adhering, in the form of a compound of Zr, to the surface of a lithium transition metal complex oxide not containing Zr.

4. The nonaqueous electrolyte secondary battery according to claim 3, wherein the compound of Zr is in the form of a particle.

5. The nonaqueous electrolyte secondary battery according to claim 1, wherein said lithium transition metal complex oxide B is expressed by a chemical formula: $Li_bMn_sNi_tCo_uMo_vO_2$, where b, s, t, u and v are numerals satisfying equations of $0<b\leq1.2$, $s+t+u=1$, $0<s\leq0.5$, $0<t\leq0.5$, $u\geq0$ and $0.001\leq v\leq0.05$.

6. The nonaqueous electrolyte secondary battery according to claim 1, wherein an amount of Mn and an amount of Ni in said lithium transition metal complex oxide B are substantially equal in a molar ratio.

7. The nonaqueous electrolyte secondary battery according to claim 1, wherein a proportion of said positive active material which the lithium transition metal complex oxide A makes up is 51 to 90 weight %.

8. The nonaqueous electrolyte secondary battery according to claim 1, wherein said positive active material and said negative active material are contained in such a way that the ratio between charge capacities of the positive electrode and the negative electrode in the case of selecting 4.3 V as an end of charge voltage is 1.0 to 1.2.

9. The nonaqueous electrolyte secondary battery according to claim 1, wherein said positive active material and said negative active material are contained in such a way that the ratio between charge capacities of the positive electrode and the negative electrode in the case of selecting 4.4 V as an end of charge voltage is 1.0 to 1.2.

* * * * *